Patented Oct. 10, 1933

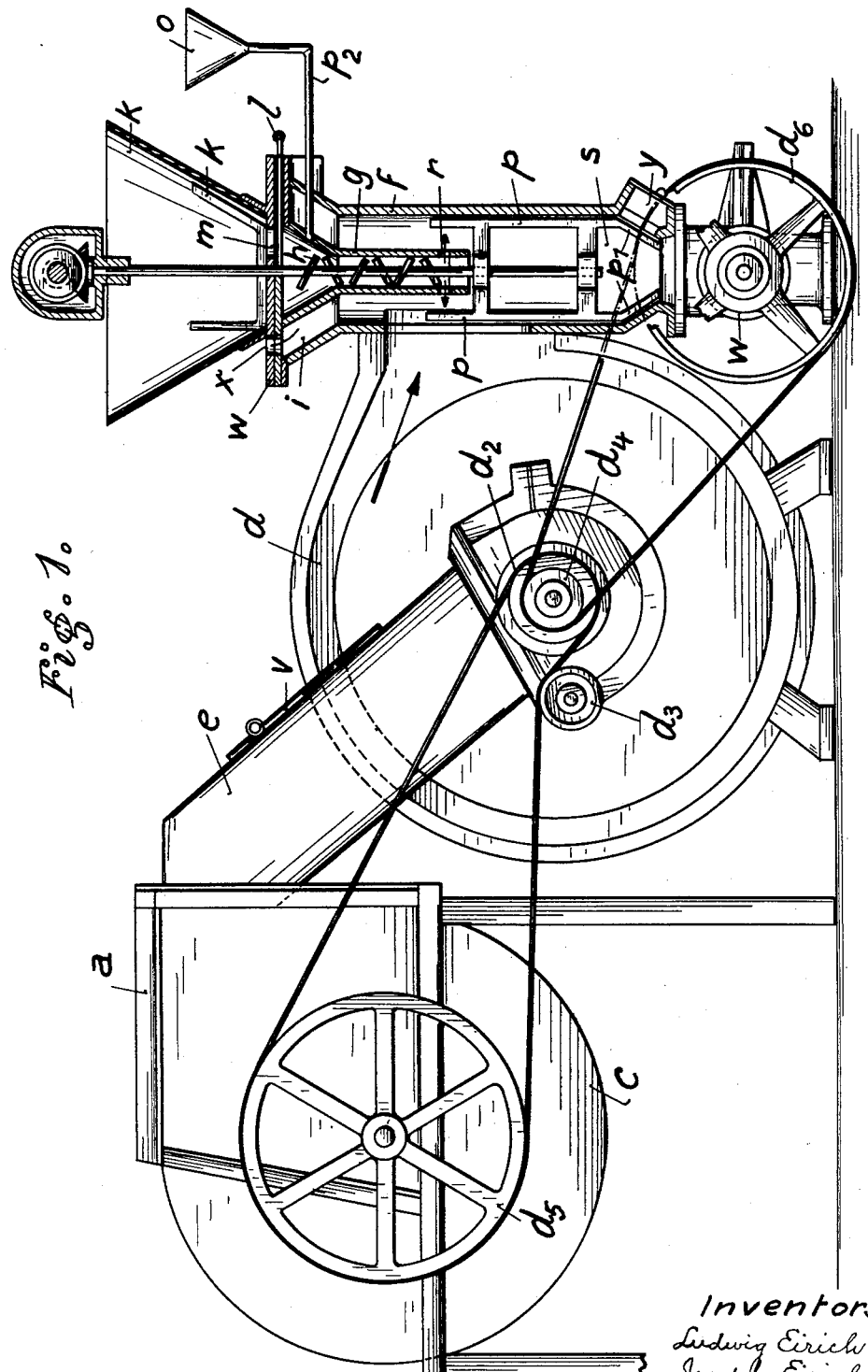

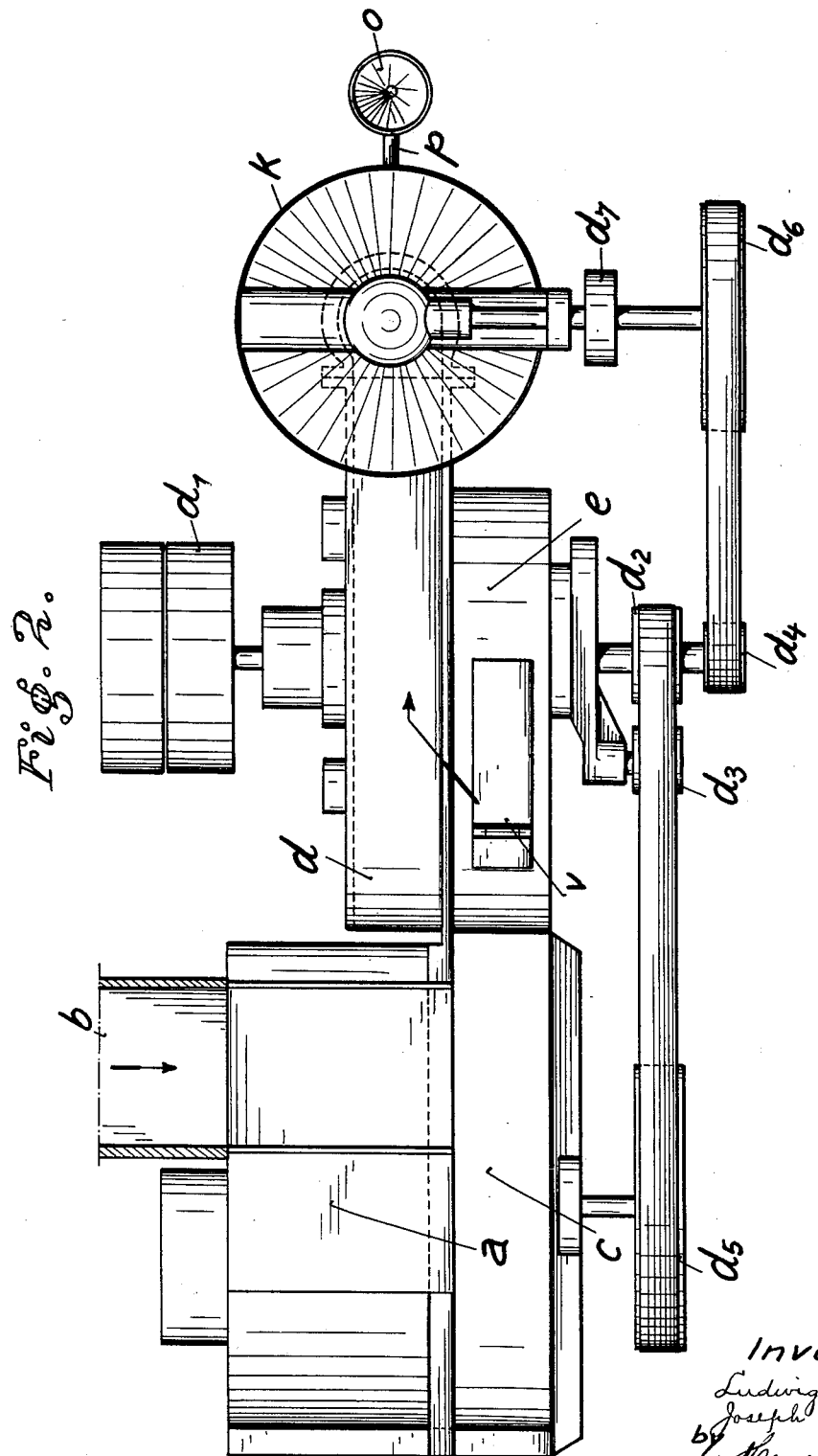

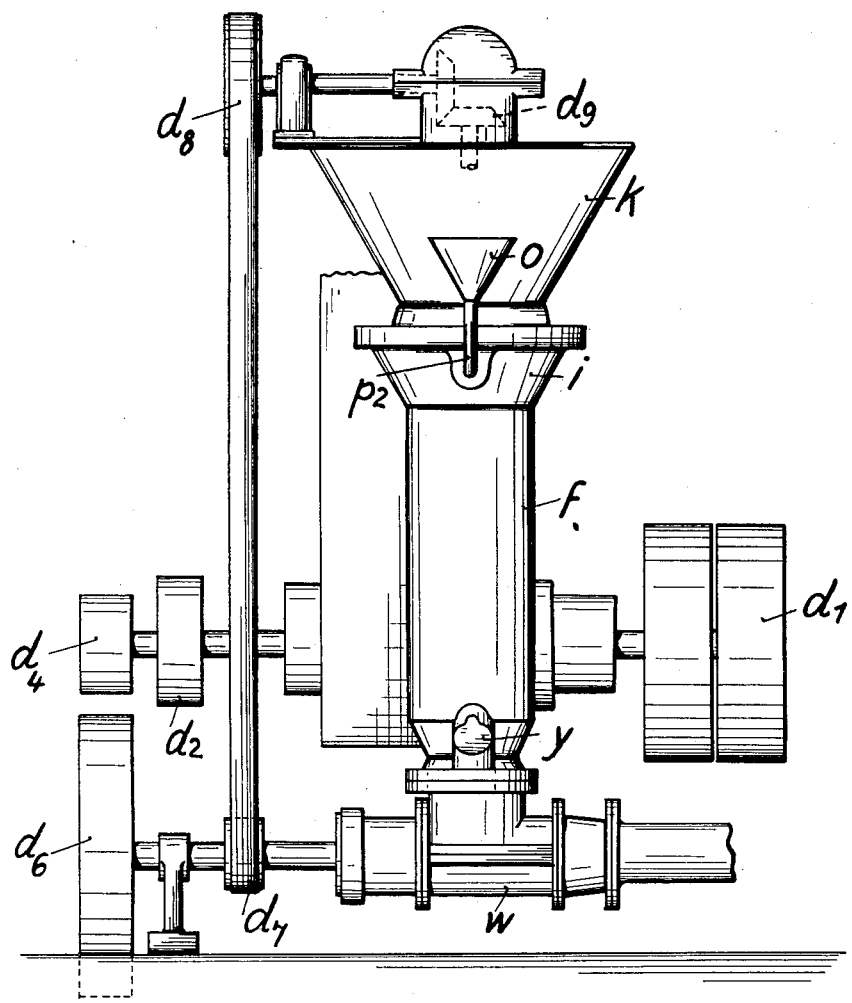

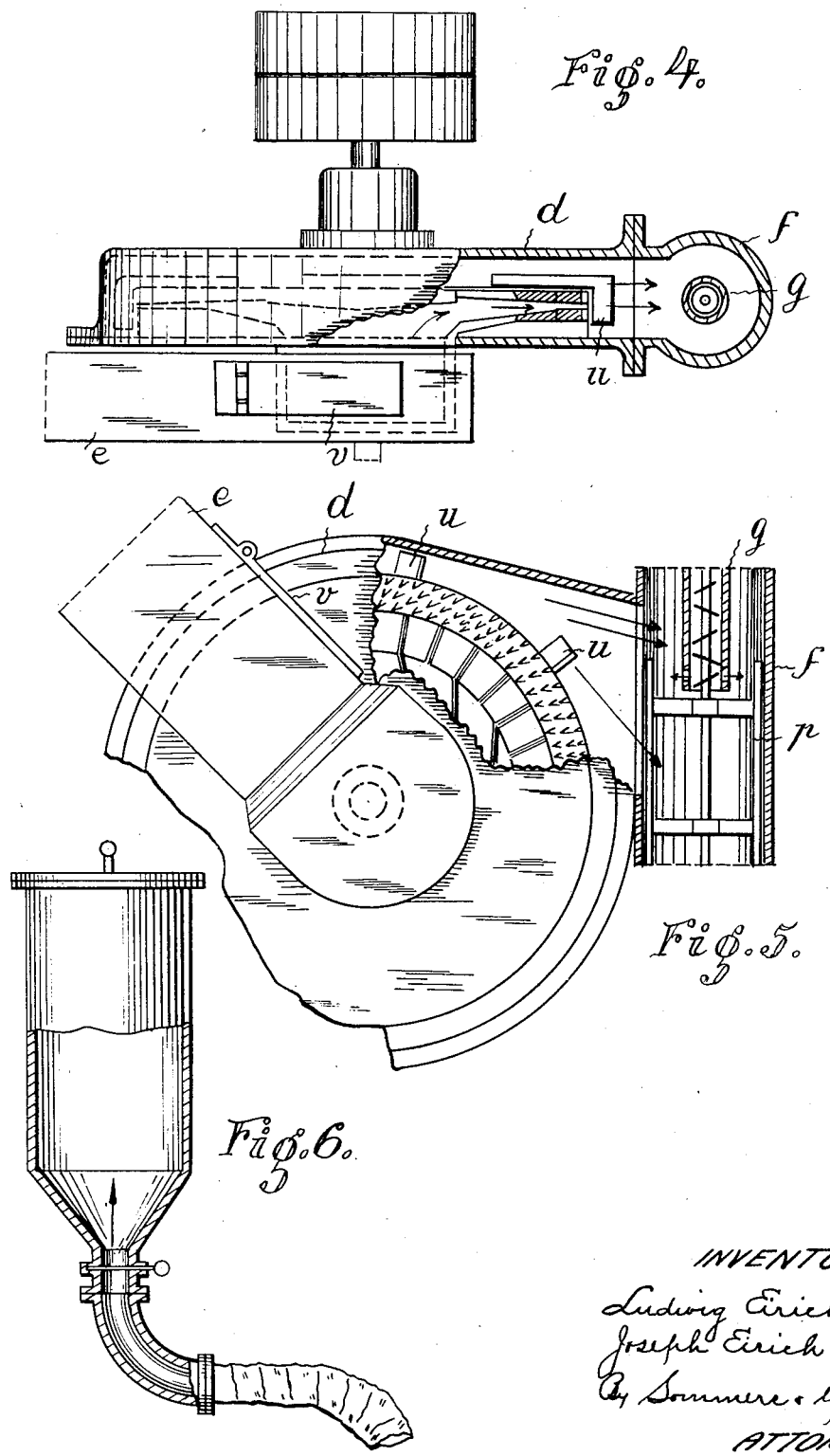

1,930,422

UNITED STATES PATENT OFFICE 1,930,422

PLANT FOR PREPARING FODDER FROM PLANTS

Ludwig Eirich and Joseph Eirich, Hardheim, Germany

Application July 26, 1930, Serial No. 470,997, and in Germany July 30, 1929

2 Claims. (Cl. 146—79)

This invention relates to a plant for preparing fodder of different kinds from fresh or dried plants or plant-parts with or without additions.

The novelty consists in that the vegetable substances are disintegrated, when passing once through a preparing plant, or torn in their structure, and admixed with additions such as potato flakes or the like, or with liquids, that as final product a fibrous paste of certain composition is obtained, which is adapted to be preserved, for a long time, in an airtightly closed container, without getting spoiled. The plant, which effects the disintegration, admixing and the like comprises the following arrangements.

According to the invention a chaff cutter, a disintegrating machine, mixer and pump for thick slime are connected the one with the others so that the vegetable substances fed to the chaff cutter are transformed into a paste of any desired density at one single passage through all machines, accession of air being prevented as much as possible. This paste is positively conveyed from the mixer into a pump, i. e. a helical pump, which forces the paste through pipe-or-hose conduits into a storing container. In this manner the natural green fodder is, in the cheapest manner, converted into a form, which enables to preserve it for any desired length of time in an air tightly closed container.

The fresh green fodder is gripped from the charging box of a chaff cutter by the conveying bands and cut into short pieces by knives mounted on the main shaft. A sheet metal casing covering the knives receives the cut fodder, whereas throwing blades or similar elements on the arms of the knive frame throw the cut fodder through a tubular connection piece into the neck of the disintegrating machine, where it passes directly into the grinding zone and is cut or crushed to form a felt-like paste. A disintegrating machine with vertical or horizontal grinding zone of hard rubber is preferably chosen, or any other suitable crushing machine.

Throwing blades $u$ are arranged on the rotating grinding wheels, and throw the disintegrated material into the mixing space of the mixer, in which a central stationary tube for a rotating moistening screw is arranged. To this screw the additional substances of any kind and also water or other liquid for moistening are supplied through a funnel with agitating arms arranged above the stationary central tube enlarged at the upper end. Through an aperture, adapted to be regulated by a register, the additional substances (potato flakes) can be supplied to the screw conveyer in desired quantity. The substances to be added are uniformly moistened and flow through apertures in the lower portion into the large mixing space, where they encounter the fodder paste thrown at considerable speed from the disintegrating machine.

The mixing proper of the disintegrated vegetable substances with addition such as potato paste and water takes place in the mixer with the aid of agitating blades arranged in the mixing space, said blades moving at the same time along the wall of the mixing space to scrape off the adhering material.

The air currents produced by the throwing blades on the knive frame of the chaff cutter and by the action of the disintegrating machine escape into the atmosphere through apertures in the lid of the mixer.

The preparing plant is illustrated by way of example in the accompanying drawings in which:

Fig. 1 is a side elevation with the mixing cylinder shown in section.

Fig. 2 is a plan view of the plant.

Fig. 3 is an end view.

Fig. 4 is a plan view partially in section of the comminuting apparatus.

Fig. 5 is a lateral elevation partially in section of the comminuting apparatus.

Fig. 6 is a vertical sectional view of a silo adapted to be filled from the lower end.

On the side of the chaff cutter $a$ a charging box $b$ and on the opposite side a protecting or throwing box $c$ are arranged, a tubular chute $e$ leading from said box $c$ to a disintegrating machine $d$. The topped vegetable material passes through the pipe $e$ directly into the grinding zone of the comminuting machine $d$.

The throwing faces of wings or blades $u$ on the rotating grinding wheel throw the material into the vertical mixing cylinder $f$, which is directly joint to the mixer, and in the upper portion of which a stationary central tube $g$ for the additional substances is arranged. In this tube $g$ a screw conveyor $h$ is accommodated, such as used for instance in string presses of the ceramic industry. Pins on the wall of tube $g$ prevent the mass from rotating with the tube and from clogging the conveyor screw. The tube $g$ has at its top end a funnel shaped neck $i$, covered by a plate $w$ having apertures $x$ for the discharge of air. This plate has further one aperture $m$, or several such apertures, allowing the inflow of the additional substance from a charging hopper $k$. In this hopper $k$ rotating blades $k_1$ are arranged which push the material to the aperture $m$. A register $l$ serves to regulate the width of the aperture $m$. Through a stationary tube $p_2$ tapping into the funnel shaped enlarged part $i$ water is supplied from a reservoir $o$ to the tube $g$ and screw conveyor $h$. Through the lower apertures $r$ the additional substance, such as potato flake paste, is forced into the mixing cylinder $f$ where it encounters the paste of fodder thrown at high speed from the disintegrating machine $d$ and admixes with the same. A mixing blade $p$, having several arms, effects the thorough mixing of potato flake paste and green fodder, and also scrapes off the inner surface of the mixing cylinder $f$ the material sticking on this wall. The mixing cylinder $f$ tapers at the lower end to a funnel $s$, along the walls of which the inwardly bent portions $p'$ of the blades $p$ scrape. These blade portions $p'$ may be inclined in helical shape in order to force the slippery paste into the pump $w$ situated under the mixer, whence the paste is conveyed into the silo. A separated compartment $y$ serves for taking samples. The pump is shut off against access of air by the fodder paste in the collecting chamber $s$.

The several machines of the plant are preferably driven from the mechanically driven disintegrating machine $d$ by belt, chain or the like. On one end of the shaft of the disintegrating machine $d$ a fixed and loose pulley $d_1$ are arranged, whereas on the other end a belt pulley $d_2$ with stretching roller $d_3$ and a belt pulley $d_4$ are arranged. The belt pulley $d_2$ drives a pulley $d_5$ on the shaft of the chaff cutter $a$, whereas the pulley $d_4$ drives the pulley $d_6$ on the shaft of the helical pump $w$. A second belt pulley $d_7$ on the pump shaft drives through the intermediary of the pulley $d_8$ an upper shaft carrying bevel wheels $d_9$ for the agitating-and-mixing mechanisms $g$, $h$ and $f$, $p$.

Certain fodder plants such as beet root leaves, potatoes, swedes and the like need no pre-disintegration by the chaff cutter, so that, after having been cleaned from adhering earth, they are charged directly into the charging chute $e$ of the disintegrating machine. This chute has for this purpose a flap $v$ adapted to be lifted.

The machines which form the preparing plant i. e. chaff cutter $a$, disintegrating machine $d$, agitator and mixer $f$ and pump $w$ might be mounted on a frame having wheels, in order to transport them rapidly from one place to another place.

As silos vertical sheet metal vessels are used, the lower portion of the vessel having the form of a truncated cone to be filled from this lower end. The air is forced out of the vessel by the rising mass. The silos are airtightly closed when they have been filled.

We claim:

1. A plant for preparing fodder from vegetable material comprising a disintegrating device having rotary grinding elements and throwing blades mounted on the grinding elements, a mixing device for mixing the products of the disintegrating device with additional material, said mixing device having a mixing chamber, means for feeding the additional material into the mixing chamber from above, the chamber having an opening in its upper portion toward the throwing blades of the disintegrating machine to admit material thrown by the blades, mixing blades in the mixing chamber, and means for removing mixed material from the lower portion of the mixing chamber.

2. A plant for preparing fodder from vegetable material comprising a disintegrating mechanism having impact elements, a mixing mechanism having a funnel-shaped casing and mixing blades therein for mixing additional substances and fluid, the casing of the mixing mechanism being provided with an opening toward the disintegrating mechanism in position to receive disintegrated material thrown by the impact elements, said casing also being provided with an opening through which air may be removed, a rigid tube extending into the casing and having a supply funnel with agitating arms, said tube having a spiral conveyor, and a water supply pipe extending into the casing, the upper portion of the casing having openings for expelling air.

LUDWIG EIRICH.
JOSEPH EIRICH.